United States Patent
Nakashima et al.

(10) Patent No.: US 7,038,485 B2
(45) Date of Patent: May 2, 2006

(54) TERMINATING RESISTOR DEVICE AND A METHOD FOR TESTING A TERMINATING RESISTOR CIRCUIT

(75) Inventors: Hidemi Nakashima, Kanagawa (JP); Masakazu Kurisu, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 76 days.

(21) Appl. No.: 10/747,271

(22) Filed: Dec. 30, 2003

(65) Prior Publication Data
US 2004/0150421 A1    Aug. 5, 2004

(30) Foreign Application Priority Data
Jan. 8, 2003    (JP)    ............... 2003-001737

(51) Int. Cl.
    *H03K 17/16*    (2006.01)
(52) U.S. Cl. .......................... 326/30; 326/16
(58) Field of Classification Search ............ 326/16, 326/30, 62, 82; 714/726, 727
    See application file for complete search history.

(56) References Cited

U.S. PATENT DOCUMENTS

| | | | | |
|---|---|---|---|---|
| 5,254,883 A | * | 10/1993 | Horowitz et al. | ............. 326/30 |
| 5,444,404 A | * | 8/1995 | Ebzery | ..................... 327/185 |
| 5,621,335 A | * | 4/1997 | Andresen | .................. 326/30 |
| 6,389,566 B1 | * | 5/2002 | Wagner et al. | .............. 714/726 |
| 6,535,945 B1 | * | 3/2003 | Tobin et al. | ................. 710/305 |

FOREIGN PATENT DOCUMENTS

| | | |
|---|---|---|
| JP | 8-162930 | 6/1996 |
| JP | 10-198473 | 7/1998 |

* cited by examiner

*Primary Examiner*—Daniel Chang
(74) *Attorney, Agent, or Firm*—McGinn IP Law Group, PLLC

(57) ABSTRACT

An object of the present invention is to provide a terminating resistor device and a testing method, by which the resistance value of a terminating resistor circuit can be test effectively. The test procedure starts with setting a MUXSCANFF circuit which functions as a selecting circuit in scan mode for test. Then, input a test signal to the scan input and/or clock input. Thereby, a particular resistor element for one bit only is set ON. By detecting the resistance value of this resistor element that has been set ON, it is test whether the one-bit resistance element conforms to manufacturing specification. Select another one of the one-bit resistor elements in order and test each one-bit resistor element, thereby testing all resistor elements.

10 Claims, 5 Drawing Sheets

TERMINATING RESISTOR DEVICE AND A METHOD FOR TESTING A TERMINATING RESISTOR CIRCUIT

BACKGROUND OF THE INVENTION

1. Field of the Invention

The present invention relates to a terminating resistor device and a method for testing a terminating resistor circuit.

2. Description of Related Art

With a rapid advance of information technology (IT), transmission speed of data communicated on a transmission line is becoming higher and higher. To meet a variety of user needs, the type or the number of equipments that are connected to transmission lines varies, according to usage of computers or computer networks. As is known, some types of equipments that are connected to transmission lines are equipped with a variable terminating resistor device for impedance matching between a transmission line and the equipment. The equipments that are connected to transmission lines are, for example, a plurality of personal computers (PC). As for a serial or parallel interface which is used for connection between the computers, several specification are known. The computers are equipped with I/O interface circuits compliant with specification which may differ and data communication is performed between the I/O interface circuits.

Some types of I/O interface circuits are equipped with an I/O buffer in which the variable terminating resistor circuit for impedance matching is installed. By adjusting the resistance value of the terminating resistor circuit, multi-reflection of transmitted signals because of impedance mismatch between ICs for communication devices and a transmission line, distorted waveforms of the transmitted signals caused by the multi-reflection, and transmission errors involved can be suppressed. Load on a transmission line varies, depending on change in the number of equipments connected to the transmission line. By adjusting the resistance value of the terminating resistor circuit, according to such variation in the load, impedance mismatch with the transmission line can be eliminated.

Some computer in which terminating resistor devices are installed at either ends of internal bus lines is known (refer to Japanese Patent Document JP-A-Hei 10-198473). Resistors having the same resistance value as the characteristic impedance of the bus lines are used in the terminating resistor devices. The terminating resistor devices prevent signal waveform distortion which is caused by the following phenomenon. Output signals are reflected at either ends of a bus line and a reflected signal is superimposed on an output signal. Accordingly, the terminating resistor devices can prevent data transmission errors due to distorted waveforms. By user need, a variable number of IC boards are connected to the bus. By change of the IC boards connected, the bus line impedance varies. The terminating resistor devices can suppress impedance mismatch with the transmission line by changing the resistance value thereof, accommodating the IC boards connected.

As the terminating resistor devices of a variable resistance value type, which are installed at the ends of a transmission line, as described above, a terminating resistor device whose terminating resistance value is adjusted by bit switching is known. FIG. 1 is a block diagram showing a simplified structure of a terminating resistor device of a typical bit switching type. FIG. 1 gives an example of the terminating resistor device installed in a receiving circuit in an I/O buffer circuit. In FIG. 1, reference numeral 101 denotes a terminating resistor circuit which performs impedance matching with the transmission line; 109 denotes a receiving circuit which receives data carried on the transmission line; 104 denotes a decoder circuit which sends a control signal to the terminating resistor circuit; and 110 denotes terminals for bit control through which a control instruction is input to the decoder circuit. The terminating resistor circuit 101 comprises a plurality of resistor elements 102 connected in parallel and each resistor element is equipped with a control terminal. By a control signal input to the control terminal, ON/OFF control of each resistor element is performed. Each control terminal is connected to the decoder circuit 104 and the resistance value of the terminating resistor circuit 101 is determined by a control signal from the decoder circuit 104.

After manufacturing a device including the terminating resistor circuit 101, it is necessary to test that the terminating resistor circuit 101 conforms to specification. Testing the forgoing prior-art terminating resistor device is performed through the following process. Initially, from the terminals 110 for bit control, an instruction to set one resistor element ON, for example, to set a first-stage resistor element ON, is input. The decoder circuit 104 decodes the instruction and sends a control signal to the terminating resistor circuit 101. Only the first-stage resistor element of the terminating resistor circuit 101 is set ON and the remaining resistor elements are set OFF. The resistance value of the terminating resistor circuit 101 in this state is measured at input terminals 105 and 106. It is determined whether the measured resistance value conforms to the specification.

Next, an instruction to set another resistor element ON, for example, to set a second-stage resistor element ON, in addition to the first-stage resistor element, is input from the terminals for bit control 110 to the decoder circuit 104. The first-stage and second-stage resistor elements are set ON in the terminating resistor circuit 101 and the remaining resistor elements are set in the OFF state. The resistance value of the terminating resistor circuit 101 in this state is measured and it is determined whether the measured resistance value conforms to the specification. The same process is repeated for other resistor elements in order and the number of resistor elements that are set ON is incremented one by one, and the resistance value of the terminating resistor circuit 101 is measured in each step.

In this way, a conventional test method is to test whether the resistance value of the terminating resistor circuit conforms to the specification, while increasing the number of resistor element that are set ON. Therefore, the resistance value measurements of the terminating resistor circuit are susceptible to measurement errors. Moreover, because a signal for test is input via the decoder circuit to the terminating resistor circuit 101, it is difficult to discriminate between a fault in the decoder circuit 104 and a fault in the terminating resistor circuit 101.

Meanwhile, an input circuit in which an input signal waveform can be adjusted without modifying the circuit board is known (refer to Japanese Patent Document JP-A-Hei 8-162930). This circuit is configured such that a plurality of serial circuits, each consisting of a pull-up resistor and a pull-up switching element connected in series, are connected in parallel between a pull-up power supply and an input terminal, a plurality of serial circuits, each consisting of a pull-down resistor and a pull-down switching element connected in series, are connected in parallel between a pull-down power supply and the input terminal, and the circuit includes a control circuit for performing ON/OFF control of the pull-up switching elements and the pull-down switching elements

SUMMARY OF THE INVENTION

An object of the present invention to overcome the drawbacks of the foregoing prior-art terminating resistor device and test method is to provide a terminating resistor device and a method for testing a terminating resistor circuit, by which the accuracy of test is enhanced.

A terminating resistor device according to the present invention comprises a terminating resistor circuit comprising a plurality of resistor elements, wherein a terminating resistance value can be changed by controlling the plurality of resistor elements, and a selecting circuit for test which can output a test signal to serially select one or a plurality of resistor elements out of the plurality of resistor elements. Through this arrangement of the terminating resistor device, the resistance value of the terminating resistor circuit can be test effectively.

The above terminating resistor device further comprises a control circuit which outputs a control signal to control the resistance value of the terminating resistor circuit. The selecting circuit for test is connected between the control circuit and the terminating resistor circuit in a circuitry arrangement. It is preferable that the selecting circuit for test selectively outputs the control signal from the control circuit or the test signal to the terminating resistor circuit. Through this arrangement, the test signal and the control signal can be sent effectively to the terminating resistor circuit. Moreover, the above selecting circuit for test, preferably, can output a signal input from the control circuit to its scan output in order to test the control circuit. Through this arrangement, discrimination can be made between a fault in the control circuit and a fault in the terminating resistor circuit. The selecting circuit for test is preferably a MUXSCANFF circuit comprising a plurality of flip-flop circuits. Through this arrangement, the control circuit and the terminating resistor circuit can be test effectively.

In the above terminating resistor device, preferably, the selecting circuit for test outputs the test signal to serially select a different resistor element out of the plurality of resistor elements. Through this arrangement, the resistance value of the terminating resistor circuit can be test effectively.

In the above terminating resistor device, preferably, the test signal serially selects one or two resistor elements out of the plurality of resistor elements and sets the selected one or two resistor elements ON. Through this arrangement, the resistance value of the terminating resistor circuit can be test effectively.

A data transmission equipment according to the present invention includes a terminating resistor device, the terminating resistor device comprises a terminating resistor circuit comprising a plurality of resistor elements, wherein a terminating resistance value can be changed by controlling the plurality of resistor elements, and a selecting circuit for test which can output a test signal to serially select one or a plurality of resistor elements out of the plurality of resistor elements.

The above data transmission equipment further comprises a transmitting section for transmitting data and a receiving section for receiving data, wherein at least either of the transmitting section and the receiving section can be equipped with the terminating resistor circuit.

Also, the present invention provides a method for testing a terminating resistor circuit comprising a plurality of resistor elements, wherein a terminating resistance value can be changed by controlling the plurality of resistor elements. The method comprises the steps of: (a) selecting one or a plurality of resistor elements out of the plurality of resistor elements; (b) detecting the resistance value of the one or plurality of resistor elements selected; (c) selecting one or a plurality of resistor elements different from the one or plurality of resistor elements selected; (d) detecting the resistance value of the one or a plurality of resistor elements selected in the step (c). By the method built as above, the resistance value of the terminating resistor circuit can be test effectively.

In the above testing method, preferably, the resistance values of all resistor elements in the terminating resistor circuit are detected by repeating the steps (c) and (d). It is also preferable to select one resistor element or two resistor elements at a time from the plurality of resistor elements in order to detect the resistance value thereof.

The above testing method selects two resistor elements at a time from the plurality of resistor elements in order to detect the resistance value thereof and can further comprise the step of detecting for a faulty resistor element by comparing the detected resistance value with a predetermined value range. Through this step, a faulty resistor element can be detected.

The above testing method, preferably, further comprises the steps of: selecting between a test of a control circuit which controls the resistance value of the terminating resistor circuit and a test of the terminating resistor circuit; and, if the test of the control circuit is selected, testing an output signal from the control circuit. Through these steps, discrimination can be made between a fault in the terminating resistor circuit and a fault in the control circuit.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

Preferred embodiments of the present invention will be described hereinafter as examples of the embodiments in which the invention can be applied.

Figure 1:
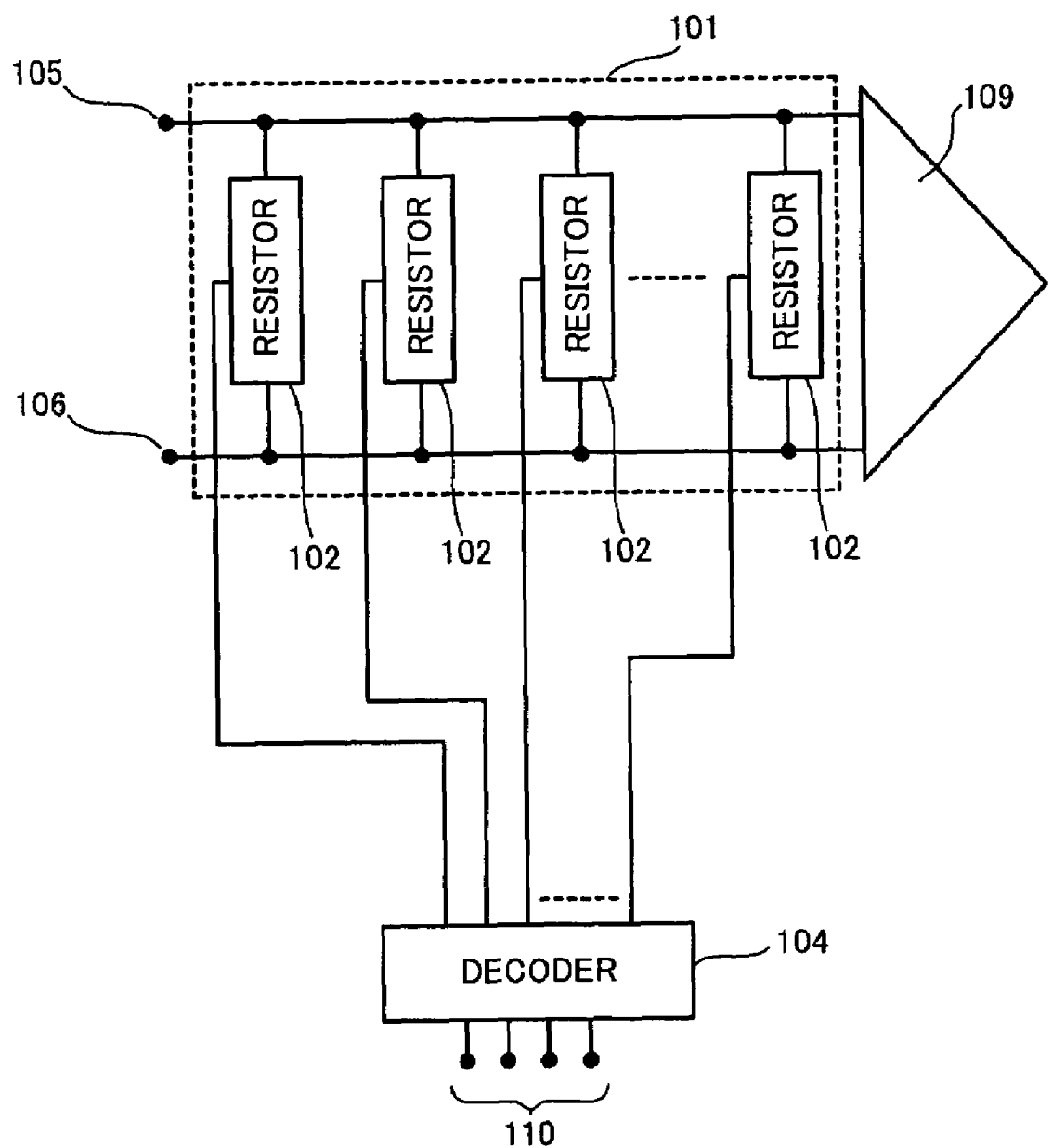
FIG. 1 is a block diagram showing a simplified configuration of a prior-art terminating resistor device.
Figure 2:
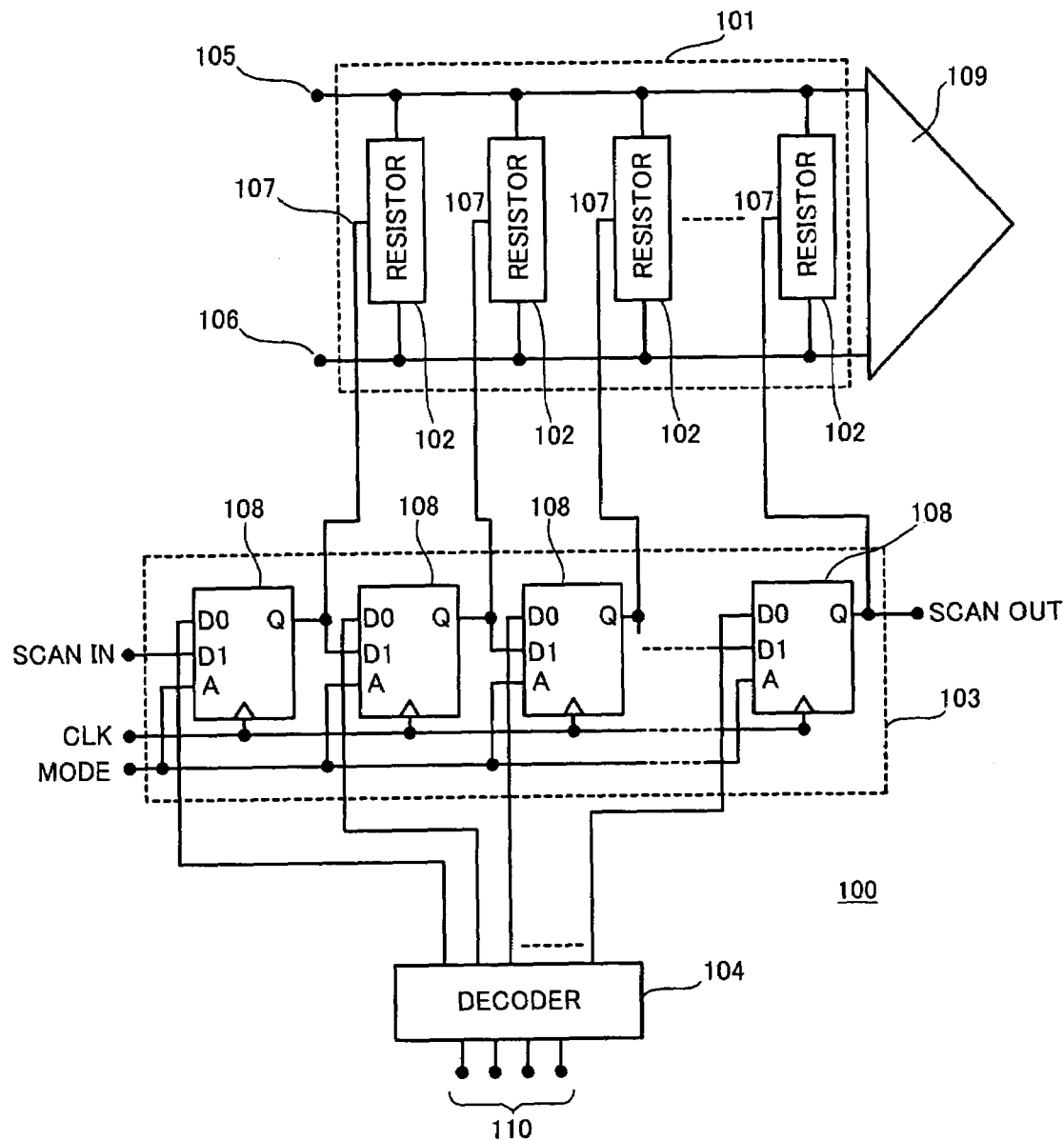
FIG. 2 is a block diagram showing a simplified configuration of a terminating resistor device according to a preferred Embodiment 1 of the invention.

FIG. 2 is a block diagram showing a simplified configuration of a terminating resistor device 100 according to a preferred Embodiment 1 of the invention. FIG. 2 gives an example of the terminating resistor device installed in a receiving section of I/O circuitry. In FIG. 2, reference numeral 101 denotes a terminating resistor circuit comprising a plurality of resistor elements 102 to be controlled by signals 110 of several bits; 103 denotes a selecting circuit for test on the terminating resistor circuit 101; 104 denotes a decoder circuit for controlling a resistance value of the terminating resistor circuit 101. The selecting circuit 103 for test is connected between the decoder circuit 104 and the terminating resistor circuit 101 in a circuitry arrangement. A control signal from the decoder circuit 104 is input to the resistor circuit 101 via the selecting circuit 103 for test.

The terminating resistor circuit 101 comprises a plurality of resistor elements 102 connected in parallel. On end of each resistor element 102 is connected to a connection terminal 105 and the other end thereof is connected to a connection terminal 106. The connection terminals 105 and 106 are connected to transmission lines. Reference numeral 109 denotes a receiving circuit. Each resistor element 102 corresponds to one-bit resistive element. Each resistor element 102 can be formed by using a Metal Oxide Semiconductor Field effect Transistor (MOSFET) or a MOSFET and a WSi resistor connected in series or the like.

Each resistor element 102 is equipped with a control terminal 107 for turning its resistance value ON/OFF and ON/OFF control of each resistor element 102 can be performed by an input signal to this control terminal 107. One-bit resistance value, for example, can be set equivalent to about 2 kΩ. The control terminal 107 of each resistor element 102 is connected to the selecting circuit for test 103. By changing the number of resistor elements that are set to ON, the terminating impedance of the terminating resistor circuit 101 can be changed.

The selecting circuit 103 comprises a plurality of multiplex scan flip-flops 108 (hereinafter abbreviated to MUXSCANFF). Hereinafter, the selecting circuit 103 will be referred to as a MUXSCANFF circuit. The MUXSCANFF circuit 103 is equipped with the following terminals: clock input (CLK), mode switch input (MODE), scan input (SCAN IN), scan output (SCAN OUT), input from the decoder circuit, and output to the terminating resistor circuit 101. A clock signal is input to the clock input terminal. A mode switch signal is input to the mode switch input terminal. The MUXSCANFF circuit 103 operates in a scan mode and a decoder value input mode. According to either mode that is set, the MUXSCANFF circuit 103 can selectively output either the output from the decoder circuit 104 or the scan input.

Mode setting can be predefined as follows: for example, the decoder value input mode is set when a value of "0" is input to the mode switch input terminal; and the scan mode is set when a value of "1" is input to same. In the scan mode, a scan signal input to the MUXSCANFF circuit 103 is transmitted to the terminating resistor circuit 101. In the decoder value input mode, a control signal input from the decoder circuit 104 is transmitted via the MUXSCANFF circuit 103 to the terminating resistor circuit 101.

A flip-flop 108 is equipped with the following terminals: scan input D1, decoder value input D0, clock input, mode switch input A, and output Q. The decoder value input terminal of each flip-flop is connected to each corresponding output of the decoder circuit 104. To the clock input terminal of each flip-flop, a clock signal is input via the clock input terminal CLK of the MUXSCANFF circuit 103. The flip-flops 108 in the MUXSCANFF circuit 103 are connected in a chain, thus constituting the MUXSCANFF circuit 103.

The output terminal Q of each flip-flop 108 is connected to the scan input terminal D1 of the next-stage flip-flop 108. The output terminal Q of the last-stage flip-flop is equivalent to the scan output. The output terminal Q of each flip-flop is connected to the control input terminal 107 of each corresponding resistor element 102 in the terminating resistor circuit 101. It can be assumed that the flip-flops 108 in the MUXSCANFF circuit in Embodiment 1 are configured to be equipped with a scan MUX (multiplexer) before the D-type flip-flop inputs. Input to the scan MUX is selected by a control signal to the mode switch input A. Each flip-flop 108 selects the input D0 when the mode switch input A is "0" and selects the input D1 when the mode switch input A is "1."

The decoder circuit 104 decodes input data from terminals 110 for bit control and outputs a control signal to the terminating resistor circuit. According to the control signal from the decoder circuit 104, the resistance value of the terminating resistor circuit 101 is controlled. When the MUXSCANFF circuit 103 is in the decoder value input mode, the output signal from the decoder circuit 104 is input to the terminating resistor circuit 101 via the MUXSCANFF circuit 103. When the terminating resistor device is installed in a specific equipment, for example, an instruction from a controller unit of the equipment is input to the decoder and decoded.

Controlling the resistance value of the terminating resistor circuit 101 by the decoder circuit 104 is explained as follows. When the terminating resistor device is installed and put in operation, the MUXSCANFF circuit 103 is set in the decoder value input mode. From the decoder circuit 104, control signals respective for bits within a range of several dozen bits are input to the decoder value input terminals of the flip-flops 108. A clock signal is input to the MUXSCANFF circuit 103 and the outputs Q from the flip-flops 108 are set at a value from the decoder, respectively. The output signals from the flip-flops 108 are input to the corresponding resistor elements 102 and the ON/OFF states of the resistor elements 102 are set respectively, according to the value from the decoder.

Figure 5:
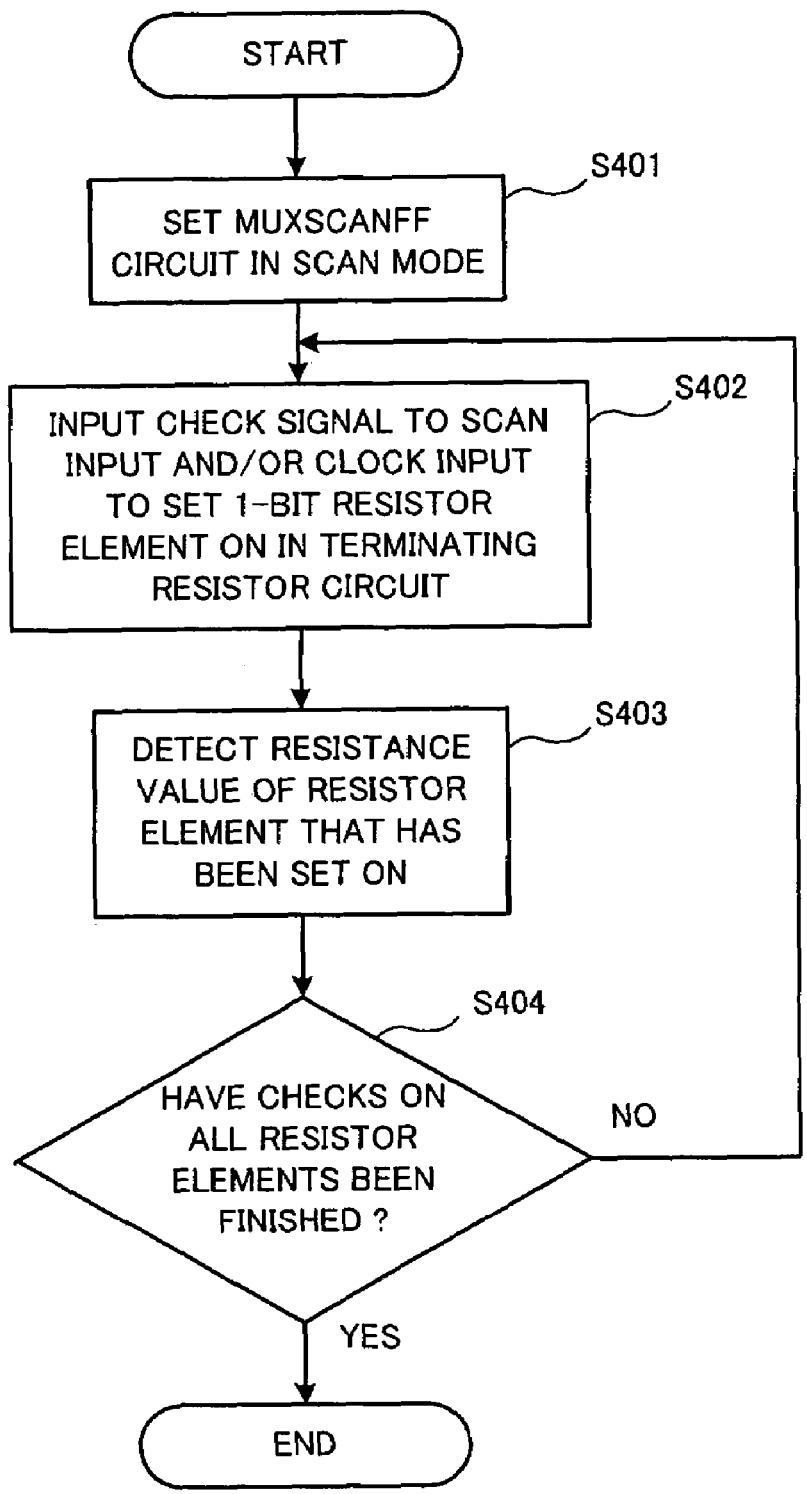
FIG. 5 is a flowchart for explaining a procedure of testing the terminating resistor device of Embodiment 1.

Next, a method for testing the terminating resistor circuit in Embodiment 1 is described. For example, test is performed to test whether the terminating resistor circuit conforms to manufacturing specification. Referring to FIG. 5, the test procedure of Embodiment 1 is described below. Set the MUXSCANFF circuit in the scan mode for test (S401). Input a test signal to the scan input and/or clock input (S402). Thereby, a particular resistor element for one bit only is set ON. By detecting the resistance value of this resistor element that has been set ON, it is test whether the one-bit resistance element conforms to the manufacturing specification (S403). Select another one of the one-bit resistor elements in order and test each one-bit resistor element, thereby testing all resistor elements.

A value of "1" is input to the mode switch input terminal of the MUXSCANFF circuit 103 and the MUXSCANFF circuit 103 is set in the scan mode. The mode switch signal is input to the mode switch input A terminals of the flip-flops 108 and the flip-flops 108 are switched to the scan mode. A scan signal is input to the scan input terminal to set only a one-bit resistor element ON in the terminating resistor circuit consisting of the resistor elements for several dozen bits in total.

In the initial state, the flip-flops are set in the reset state and a low level (hereinafter denoted by "L") signal is output from each flip-flop. A high level (hereinafter denoted by "H") signal is input to the scan input terminal of the MUXSCANFF circuit 103 and a clock signal is input once to the clock input terminal. The output Q terminal of the first-stage flip-flop outputs an "H" signal and the output Q terminals of subsequent remaining flip-flops output "L" signals. Because the outputs Q of the flip-flops 108 are input to the control terminals of the corresponding resistor elements 102 in the terminating resistor circuit, the resistor element to which the output from the first-stage flip-flop is input is set ON. Other resistor elements are set OFF. A resistance test signal is input to the terminals 105 and 106 of the terminating resistor circuit 101 and the resistance value of the one-bit resistor element that has been set ON is detected. It is test that the detected value falls within a range specified for the manufacturing specification.

Next, testing a second-bit resistor element is explained. To test the second-bit resistor element, an "L" scan signal is input to the scan input terminal of the MUXSCANFF circuit 103. Then, a clock signal is input once to the clock input terminal. Because the output Q of the first-stage flip-flop was "H" in the preceding step, the output Q of the second-stage flip-flop is set at "H." The outputs Q of the flip-flops of other stages including the first-stage are set at "L."

The resistor element to which the output from the second-stage flip-flop is input, namely, the second-bit resistor element is set ON. Other resistor elements are set OFF. As is the case for testing the first-bit terminating resistor, the resistance test signal is input to the terminals 105 and 106 of the terminating resistor circuit 101 and the resistance value of the one-bit resistor element that has been set ON is detected. It is test that the detected value falls within the range specified for the manufacturing specification.

By repeating the above-described process, testing all resistor elements 102 can be completed. In this way, by the testing method of Embodiment 1, it can be test whether the resistance value of each one-bit resistor element in the terminating resistor circuit conforms to the manufacturing specification.

The testing circuit or testing process of Embodiment 1 makes it possible to reduce the effect of measurement errors on the result of testing whether a terminating resistor conforms to standard values. For example, if a one-bit resistor element is 2 kΩ and manufacturing specification allow for ±2% of this value, measurement accuracy within ±40Ω is required. This measurement accuracy is relatively easy to achieve without errors. In the conventional test method described hereinbefore, as the number of resistor elements that are set ON is gradually increased, it is test whether the terminating resistance value conforms to manufacturing specification. Therefore, the conventional test method is susceptible to measurement errors.

With reference to a concrete example, comparison is made between the conventional test method and the test method of Embodiment 1. This comparison is explained, using an illustrative case where the terminating resistor circuit consists of 40 resistor elements of 2 kΩ. The terminating resistance value of the terminating resistor circuit 101 is 50 Ω. The resistance value of an aggregate of 39 resistor elements is 51.2 Ω. Difference between the resistance value of an aggregate of 40 resistor elements and the resistance value of an aggregate of 39 resistor elements is only about 1%. This means that, by the conventional test method, it must be test whether the fortieth resistor element conforms to manufacturing specification with measurement accuracy within 1%.

The conventional test method involves a gradual increase in the number of resistor elements that are set ON in order to test the terminating resistance value. As the number of resistor elements being ON increases, the variation range of the terminating resistance value becomes smaller. Consequently, the conventional test method is susceptible to measurement errors, which makes it difficult to determine whether the resistor circuit conforms to manufacturing specification. On the other hand, because the test method of Embodiment 1 tests the resistance value of each individual one-bit resistor element, as described above, this method is less susceptible to measurement errors and enables correct testing of the terminating resistor circuit. Moreover, the use of the flip-flops enables preventing glitch noise which, otherwise, would occur by turning a resistor element ON/OFF during the test.

A resistor element in any position in the chain can be selected as the one to be test. To do this, as is self-evident to those skilled in this art, any one-bit resistor element can be set in the ON state by appropriately selecting the scan signal and clock signal to be input to the MUXSCANFF circuit 103. Test of Embodiment 1 should preferably be performed by selecting the resistor elements for bits that need to be test in order.

Testing the decoder circuit 104 is described next. Testing the decoder circuit 104, for example, can be performed before testing the terminating resistor circuit 101. Order of the decoder circuit test and the terminating resistor circuit test is not so limited and can be selected appropriately for a test process. For example, after completing the test of the terminating resistor circuit 101, testing the decoder circuit 104 can be performed. It is easily understandable for those skilled in the art that test signals to be input to the MUXSCANFF circuit and the decoder circuit 103, specifically described herein, change, according to change of the test process.

An example of a method for testing the decoder circuit is explained. Testing the decoder circuit 104 can be performed by allowing the output signal from the decoder circuit 104 to be output to the scan output of the MUXSCANFF circuit. In order to set the decoder value input mode, initially, a control signal "0" to select the decoder value input mode is input to the mode switch terminal of the MUXSCANFF circuit 103. At this point of time, the flip-flops 108 in the MUXSCANFF circuit 103 are reset beforehand and their outputs Q are "L." The decoder circuit 104 outputs a signal to set only a particular bit "ON" in accordance with an instruction from the terminals for bit control.

The signal from the decoder circuit 104 is input to the MUXSCANFF circuit 103. A clock signal is input once to the clock input terminal of the MUXSCANFF circuit 103. The output of only the flip-flop corresponding to the bit that is to be set "ON" by the control signal is set "H" and the outputs of other flip-flops remain "L." Again, a clock signal is input to the clock input terminal of the MUXSCANFF circuit 103. By inputting the clock signal multiple times, the outputs of the flip-flops 108 connected in the chain are serially output from the scan output terminal.

The outputs from the scan output are such that the output of the flip-flop to which the control signal to set the bit ON has been input is "H" and the outputs of other flip-flops are "L." By the above-described operation, it can be test that the control signal is correctly output from the decoder circuit 104. Another control signal to set another bit ON from the decoder circuit 104 can be test in the same manner.

As set forth above, in the terminating resistor device of Embodiment 1, the decoder circuit can be test independently of testing the terminating resistor circuit. This enables discrimination between a fault in the terminating resistor circuit and a fault in the decoder circuit.

Figure 3:
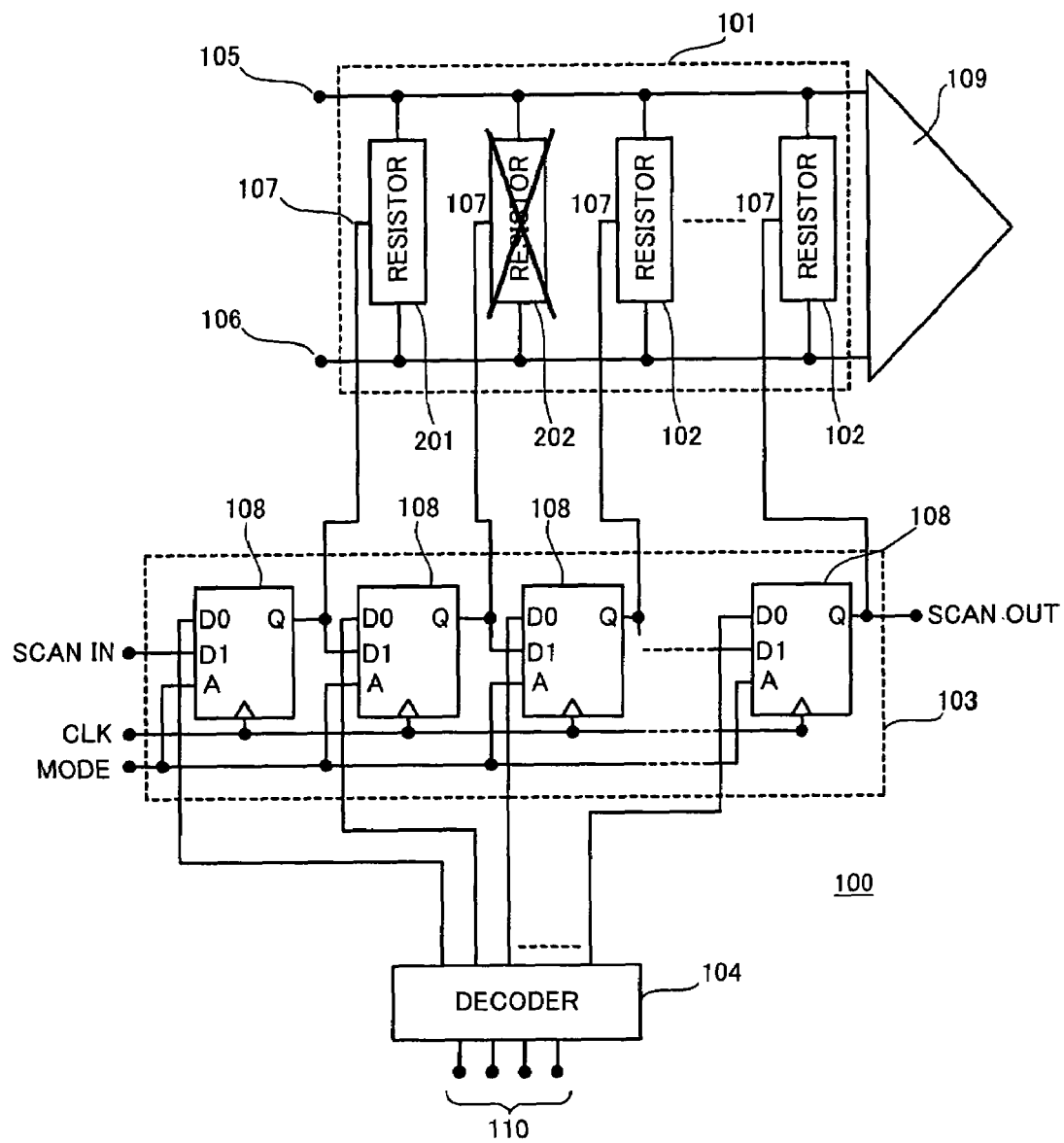
FIG. 3 is a block diagram showing a simplified configuration of a terminating resistor device according to a preferred Embodiment 2 of the invention.

A test method in accordance with a preferred Embodiment 2 of the invention is to serially select two resistor elements for two bits at a time and test the resistor elements for every two bits. Its essential process is the same as for testing each individual one-bit resistor element, except that there is a difference in the number of bits of resistor elements to be test at a time. Circuitry of Embodiment 2 is the same as that of Embodiment 1, as is shown in FIG. 2. Referring to FIG. 3, the test method of Embodiment 2 is discussed. A value of "1" is input to the mode switch terminal (MODE) of the MUXSCANFF circuit 103 and the MUXSCANFF circuit 103 is set in the scan mode. A scan signal is input to the scan input terminal to set particular two resistor elements for two bits ON in the terminating resistor circuit consisting of the resistor elements for several dozen bits in total.

In the initial state, the flip-flops 108 are set in the reset state and an "L" signal is output from each flip-flop. An "H" signal is input to the scan input terminal of the MUXSCANFF circuit 103 and a clock signal is input once to the clock input terminal. The output Q terminal of the first-stage flip-flop outputs an "H" signal and the output Q terminals of subsequent remaining flip-flops output "L" signals. Again, an "H" signal is input to the scan input and a clock signal is input once to the clock input terminal.

The outputs Q of the first-stage and second-stage flip-flops output "H" signals and the outputs Q of subsequent remaining flip-flops output "L" signals. Because the outputs Q of the flip-flops 108 are input to the control terminals of the corresponding resistor elements 102 in the terminating resistor circuit, the resistor elements 201 and 202 to which the outputs from the first-stage and second-stage flip-flops are input are set ON. Other resistor elements are set OFF. A resistance value test signal is input to the terminals 105 and 106 of the terminating resistor circuit and the resistance values of the resistors for two bits that have been set ON are detected.

In order to set any successive two resistor elements for two bits in the ON state, the clock signal must be input an appropriate number of times after inputting the second "H" signal in the above-described operation. Thereby, any successive two resistor elements for two bits can be set in the ON state. As is self-evident for those skilled in the art, by appropriately selecting the order and the number of times in which the "H" signal and the clock signal are input to the scan input terminal, any two resistor elements for two bits in the terminating resistor circuit can be set ON.

Measuring a resistance value consisting of two bits of two resistor elements is discussed. Assume that manufacturing specification of resistor elements allow for variation, for example, within ±30% of a nominal resistance value. If the resistance value for one bit is 2 kΩ, a manufacturing tolerance of a one-bit resistor element is within a range of 1.4 to 2.6 kΩ. When a resistance value consisting of two bits is measured, the manufacturing tolerance is within a range of 0.7 to 1.3 kΩ. By resistance value test, it is test whether the resistance value consisting of the two bits of two resistor elements that have been set ON falls within the range of 0.7 to 1.3 kΩ.

Suppose an instance where one one-bit resistor element 202 of the two resistor elements for two bits is faulty. Then, the measured resistance value conforms to the tolerance for a one-bit resistance value, that is, the range of 1.4 to 2.6 kΩ. From this result, it can be judged that one one-bit resistor element 202 is faulty. In other words, if the detected resistance value is greater beyond a predetermined value range, it can be detected that either resistor element is faulty. In this way, the detected resistance value consisting of two bits of two resistor elements is compared with a predetermined value range and, based on the result of the comparison, it can be determined whether one resistor element is faulty. By testing two resistor elements for every two bits, test time can be shortened. It is also possible to test three or more resistor elements for three bits or more at a time and measure a resistance value consisting of three bits or more in the terminating resistor circuit.

Figure 4:
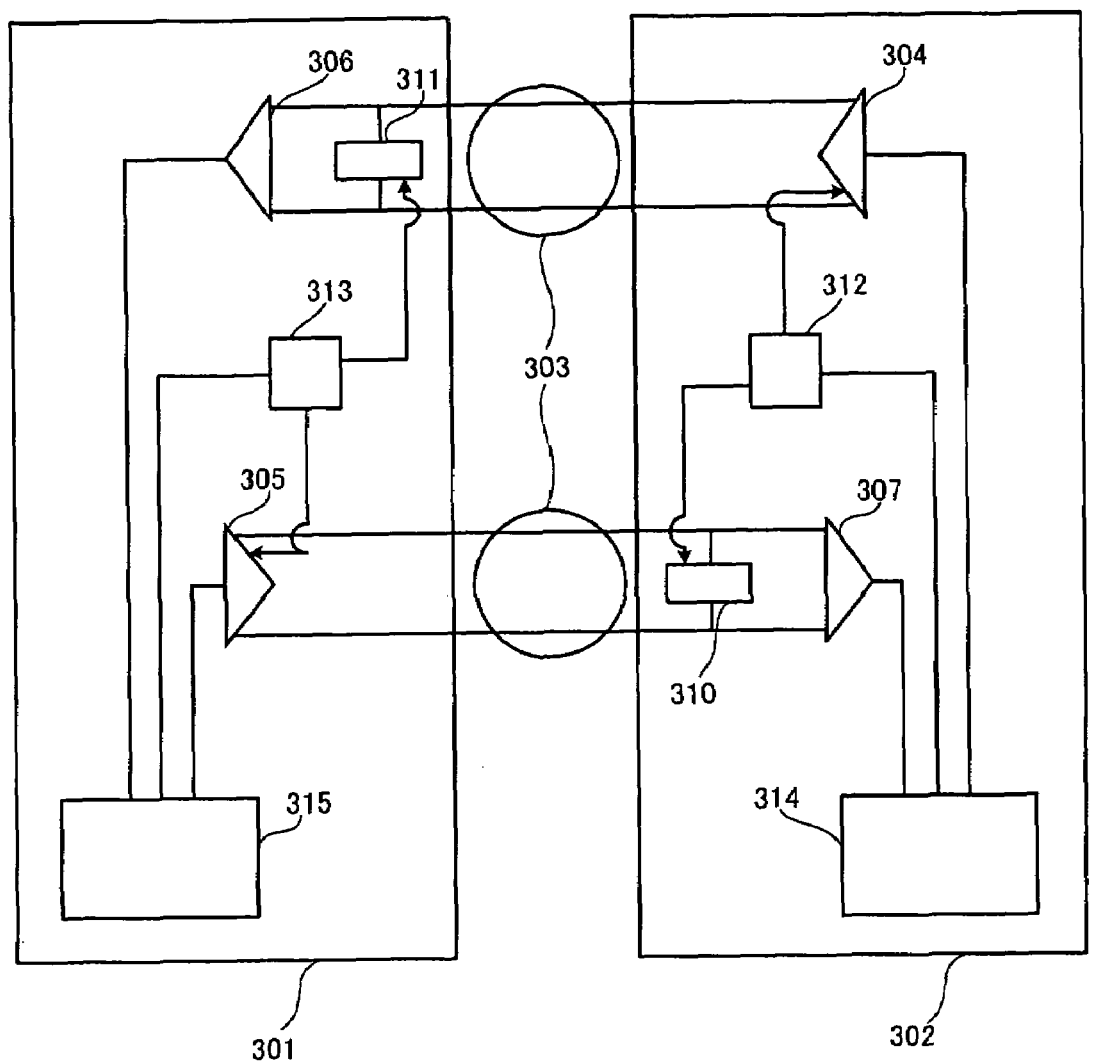
FIG. 4 is a block diagram showing a simplified configuration of I/O equipment according to a further embodiment of the invention.

FIG. 4 is a functional block diagram showing a simplified logical configuration of I/O circuitry as an example of data transmission equipment to which terminating resistor devices of the present invention are applied. In FIG. 4, reference numerals 301 and 302 denote I/O circuitry blocks which are installed in, for example, computers and connected to enable communication via transmission lines 303. Reference numerals 304 and 305 denote transmitting sections which transmit data and reference numerals 306 and 307 denote receiving sections which receive data carried on the transmission lines. Reference numerals 310 and 311 denote terminating resistor circuits installed in the receiving sections and the terminating resistor circuits are also included in output buffers in the transmitting sections.

Reference numerals 312 and 313 denote terminating resistor circuit control units which control the terminating resistor circuits. Reference numerals 314 and 315 denote internal circuits in the I/O circuitry blocks. The terminating resistor control units 312 and 313 can input a control signal to determine a resistance value or a test signal to test a resistance value to the terminating resistor circuits. Each of the terminating resistor control units 312 and 313 comprises a selecting circuit for test and a decoder circuit for the corresponding terminating resistor circuit. The selecting circuit for test and the decoder circuit can be configured as described in Embodiment 1.

According to an instruction input from the internal circuits 314 and 315, the terminating resistor control units 312 and 313 can output a test signal to the terminating resistor circuits during a test and output a control signal to control a terminating resistance value to the terminating resistor circuits during operation. The terminating resistance value is set at a proper value to eliminate impedance mismatch of the transmission lines. The terminating resistance value can be adjusted, for example, by detecting a transmission error. The I/O circuitry blocks 301 and 302 communicate data with each other with the terminating resistance values at either ends being set properly. According to a transmission instruction from the internal circuits, the data transmitting sections 304 and 305 transmit data received from the internal circuits to the other I/O circuitry block through the transmission lines.

The data receiving sections 306 and 307 output the data received through the transmission lines to the corresponding internal circuits. The terminating resistor devices of the present invention can be applied to a variety of data transmission equipment besides the foregoing I/O equipment. For example, the terminating resistor devices can be used as terminating resistor circuits of bus transmission paths on a motherboard of a computer.

The present invention can enhance the accuracy of testing a terminating resistor circuit by selectively testing resistor elements in the terminating resistor circuit.

Up to this point, the present invention has been described by way of the preferred embodiments thereof. However, the present invention is not limited only to the constructions of the foregoing embodiments. It is practicable for those skilled in the art to which the invention pertains to make modifications, alternatives, additions, or omissions to the embodiments, if necessary or preferably possible, within the scope of the invention.

What is claimed is:

1. A device, comprising:
a terminating resistor circuit having a plurality of resistor elements, each of said resistor elements having a control node and being activated to represent a predetermined resistance value when the control node takes an active level; and a selection circuit having a set of output nodes each connected to the control node of an associated one of said resistor elements, a first input node supplied in series with first selection data, a set of second input nodes supplied in parallel respectively with second selection data, and a mode node supplied with a mode signal, said selection circuit responding to said first selection data supplied in series to said first input node and producing a set of selection signals at said set of output nodes when said mode signal takes a first level, said selection circuit responding to said second selection data supplied in parallel to said set of second input nodes and producing the set of selection signals at said set of output nodes when said mode signal takes a second level.

2. The device as claimed in claim 1, wherein said selection circuit comprises a plurality of data registers, each of said data registers having a first input end, a second input end connected to an associated one of said set of second input nodes, an output end connected to an associated one of said output nodes, and a mode end connected to said mode node, said data registers being connected such that an output end of a preceding data register is connected to a first input end of a succeeding data register and a first input end of a leading data register being connected to said first input node.

3. The device as claimed in claim 2, each of said data registers capturing data at the first input end thereof in response to a clock signal when said mode signal takes said first level and capturing data at the second input end thereof in response to the clock signal when said mode signal takes said second level.

4. The device as claimed in claim 1, further comprising a decoder responding to selection information to produce said second selection data.

5. The device as claimed in claim 4, wherein said first selection data is produced in a test mode and supplied in series to said first input node.

6. The device as claimed in claim 5, wherein said mode signal takes said first level in said test mode and said second level in a mode other than said test mode.

7. A method of controlling a terminating resistor circuit that includes a plurality of resistor elements, each of said resistor elements including a control node and being activated to represent a predetermined resistance value when the control node takes an active level, said method comprising:

producing in a first mode a set of first selection signals in response to first selection data that are supplied in series;

supplying in said first mode each of said first selection signals to the control node of an associated one of said resistor elements;

producing in a second mode a set of second selection signals in response to second selection data that is supplied in parallel; and supplying in said second mode each of said second selection signals to the control node of an associated one of said resistor elements.

8. The method as claimed in claim 7, wherein said set of first selection signals is produced by shifting said first selection data by a shift register.

9. The method as claimed in claim 8, wherein said first mode comprises a test mode and said second mode comprises a normal operation mode.

10. The method as claimed in claim 9, wherein said resistor elements are divided into a plurality of groups, each of said groups including one or more resistor elements, said method further comprising activating in said test mode each of said groups in sequence to detect a resistance value of each of said groups.

* * * * *